United States Patent
Gezalov et al.

(10) Patent No.: US 10,922,411 B2
(45) Date of Patent: Feb. 16, 2021

(54) INTELLIGENT EVENT COLLECTION FOR CLOUD-BASED MALWARE DETECTION

(71) Applicant: Malwarebytes Inc., Santa Clara, CA (US)

(72) Inventors: Arif Gezalov, Westminster, CO (US); Pedro Bustamante Lopez-Chicheri, Mountain View, CA (US); Douglas Stuart Swanson, Holmfirth (GB)

(73) Assignee: MALWAREBYTES INC., Santa Clara, CA (US)

( * ) Notice: Subject to any disclaimer, the term of this patent is extended or adjusted under 35 U.S.C. 154(b) by 171 days.

(21) Appl. No.: 16/013,713

(22) Filed: Jun. 20, 2018

(65) Prior Publication Data

US 2019/0392146 A1   Dec. 26, 2019

(51) Int. Cl.
*G06F 21/56* (2013.01)
*G06F 21/55* (2013.01)

(52) U.S. Cl.
CPC .......... *G06F 21/566* (2013.01); *G06F 21/552* (2013.01); *G06F 21/554* (2013.01); *G06F 21/56* (2013.01); *G06F 21/568* (2013.01)

(58) Field of Classification Search
CPC ...... G06F 21/552; G06F 21/554; G06F 21/56; G06F 21/566; G06F 21/568
See application file for complete search history.

(56) References Cited

U.S. PATENT DOCUMENTS

| | | | |
|---|---|---|---|
| 9,734,337 B1 | 8/2017 | Patton et al. | |
| 9,990,511 B1 | 6/2018 | Dreyfus | |
| 10,169,584 B1 * | 1/2019 | Roundy | G06F 21/57 |
| 10,229,269 B1 | 3/2019 | Patton et al. | |
| 10,311,234 B2 * | 6/2019 | Bhashkar | G06F 21/566 |
| 2012/0089710 A1 * | 4/2012 | Rakowski | H04L 41/0803 709/220 |
| 2012/0254982 A1 | 10/2012 | Sallam | |
| 2014/0173739 A1 | 6/2014 | Ahuja et al. | |
| 2015/0180829 A1 | 6/2015 | Yu | |

(Continued)

OTHER PUBLICATIONS

T. Honda, K. Mukaiyama, T. Shirai, T. Ohki and M. Nishigaki, "Ransomware Detection Considering User's Document Editing," 2018 IEEE 32nd International Conference on Advanced Information Networking and Applications (AINA), Krakow, 2018, pp. 907-914 (IEEE May 18, 2018) (Year: 2018).*

(Continued)

*Primary Examiner* — Theodore C Parsons
(74) *Attorney, Agent, or Firm* — Fenwick & West LLP (57) ABSTRACT

An anti-malware application detects and remediates malware. The anti-malware application detects an event associated with a process and determines if the event matches an entry in an exclusions list. If the event is absent from the exclusions list, the anti-malware application monitors the operation of the process, logs the event data in an event log, and sends the event to a server to determine whether the process corresponds to malware. The anti-malware application updates the exclusions list based on the logged event if the process does not correspond to malware. The anti-malware application restores a file edited by the process to the saved copy of the original file prior to the file being edited by the process if the process corresponds to malware.

17 Claims, 4 Drawing Sheets

(56) References Cited

U.S. PATENT DOCUMENTS

| | | |
|---|---|---|
| 2015/0326599 A1 | 11/2015 | Vissamsetty et al. |
| 2017/0286684 A1 | 10/2017 | Lovelace et al. |
| 2018/0121650 A1* | 5/2018 | Brown .................. G06F 21/565 |
| 2018/0248896 A1 | 8/2018 | Challita et al. |
| 2018/0336351 A1* | 11/2018 | Jeffries ................ G06F 21/566 |
| 2018/0357416 A1* | 12/2018 | Ashkenazi .......... G06F 21/6209 |
| 2018/0365412 A1 | 12/2018 | Israel et al. |

OTHER PUBLICATIONS

United States Office Action, U.S. Appl. No. 16/013,726, dated Jun. 26, 2020, 11 pages.

* cited by examiner

INTELLIGENT EVENT COLLECTION FOR CLOUD-BASED MALWARE DETECTION

FIELD OF ART

The present disclosure generally relates to malware detection and remediation and more specifically to identifying relevant data for more efficient malware detection and remediation.

BACKGROUND

Malware is malicious software that can damage or lock computer files. There is no guarantee that victims of malware can regain access and can be subject to multiple attacks if they are not protected. Therefore it would be desirable to detect and stop malware.

SUMMARY

A method filters events based on an exclusions list for more efficient detection and remediation of malware. The method updates the exclusions list based on previously logged events that do not correspond to malware. A processor detects an event associated with a process performing an operation on a file. The processor determines if the event matches an entry in an exclusions list. Responsive to determining that the event is absent from the exclusions list, the processor monitors the operation of the process, the processor logs the event data associated with the process in an event log, and sends the event associated with the process to a server. Responsive to a processor detecting the opening of an original file by the process for editing, the processor saves a copy of the original file prior to the original file being edited by the process. The processor receives from the server an indication of whether the process corresponds to ransomware. Responsive to receiving an indication that the process does not correspond to ransomware, the processor updates the exclusions list based on the logged event. Responsive to receiving an indication that the process corresponds to ransomware, the processor restores a file edited by the process to the saved copy of the original file prior to the file being edited by the process.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

An endpoint agent applies a learning process to learn trusted events. The endpoint agent logs event data to an event log and sends the event data to a server if they do not match events on an exclusions list of trusted events. The server receives the event data sent from the endpoint agent, applies analysis to detect malware, and provides malware detection information to the endpoint agent. If malware is not detected, the endpoint agent can update the exclusions list based on the previously logged events that the server determined to be unrelated to malware. The endpoint agent can also save copies of original files prior to being edited by a process if the editing operation does not match an event on the exclusions list. In response to a malware attack, the log of untrusted events and the saved copies can be used to roll back changes made by the malware attack by restoring copies of original files.

Figure 1:
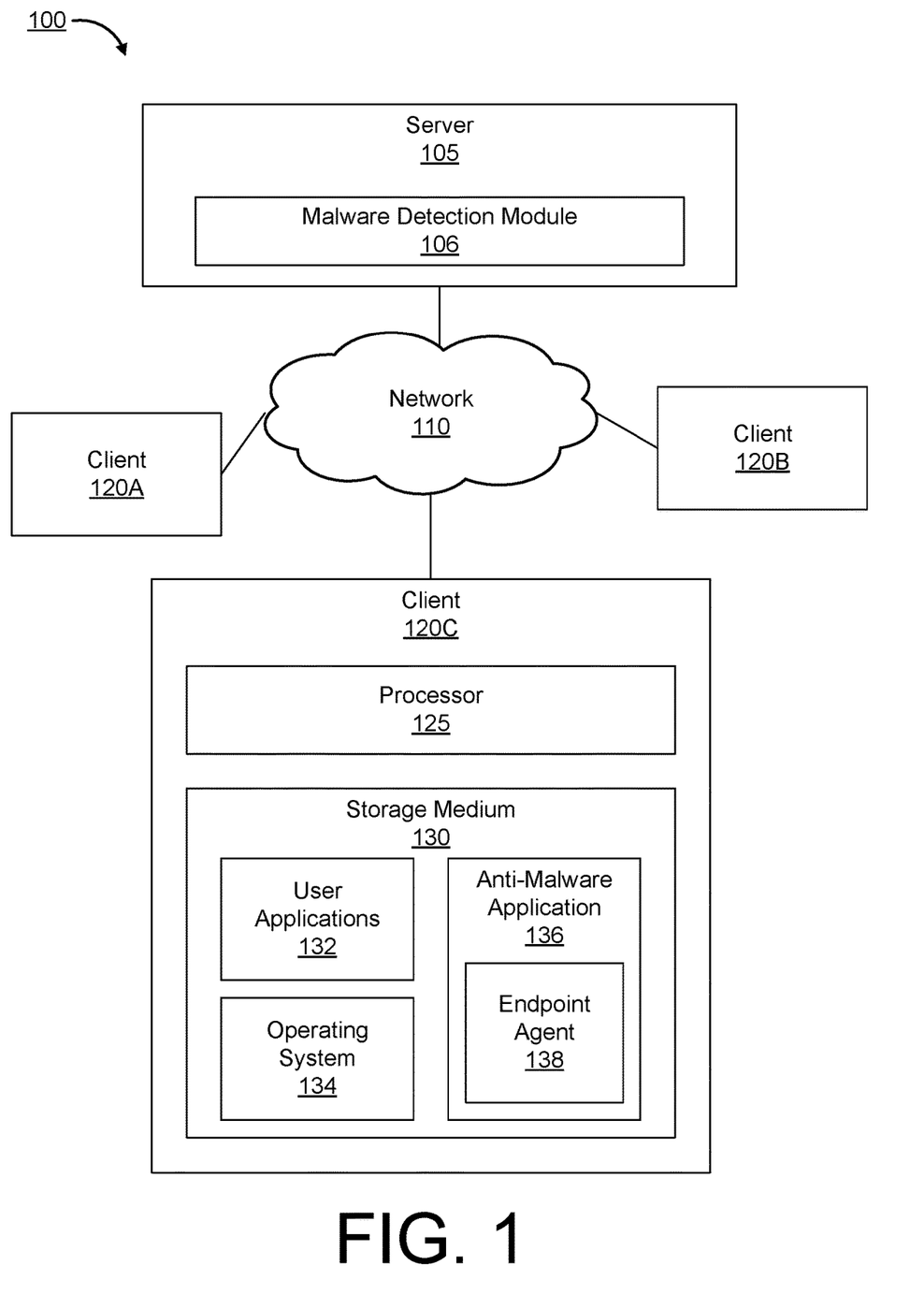
FIG. 1 is a system diagram illustrating an example embodiment of an environment in which an endpoint agent executes.

FIG. 1 is a high-level block diagram illustrating a system environment 100 for an endpoint agent. The system environment 100 comprises a server 105, a network 110, and various clients 120A, 120B, 120C (collectively referenced herein as clients 120). For simplicity and clarity, only one server 105 and a limited number of clients 120 are shown; however, other embodiments may include different numbers of servers 105 and clients 120. Furthermore, the system environment 100 may include different or additional entities.

The server 105 is a computer system configured to store, receive, and transmit data to client devices 120 via the network 110. The server 105 may include a singular computing system, such as a single computer, or a network of computing systems, such as a data center or a distributed computing system. The server 105 receives event data from the client device 120 and detects whether or not a process executing on a client 120 corresponds to malware based on the received event data. Event data is data associated with an event. An event is an operation performed by a process on a file. Event data may include information to identify the process performing the event, information to identify the file being operated on, and information identifying the type of operation being performed.

In one embodiment, the server 105 includes a malware detection module 106. The malware detection module 106 analyzes the received event data to determine whether a process corresponds to malware, which may include ransomware as well as other types of malware. The malware detection module 106 determines the process is malware based on behaviors indicative of malware. Examples of behaviors indicative of malware include the following: deleting files, injecting code from one process into another process, modifying or creating cryptographic keys in registry locations, accessing restricted locations of the operating system 134, and deleting a system recovery file. Other factors such as the process performing encryption of a file, the number of files encrypted by the process within a time window, and the age of the process may be used in determining if the process is malware. If the server 105 detects a pattern of events indicative of malware, the server 105 sends an indication to the client 120 identifying the processes, files, and events relating to the detection.

The network 110 represents the communication pathways between the server 105 and clients 120. In one embodiment, the network 110 is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each client 120 comprises one or more computing devices capable of processing data as well as transmitting and receiving data via a network 110. For example, a client device 120 may be a desktop computer, a laptop computer, a smart phone, a tablet computing device, an Internet of Things (IoT) device, or any other device having computing and data communication capabilities. Each client 120 includes a processor 125 for manipulating and processing data, and a storage medium 130 for storing data and program instructions associated with various applications. The storage medium 130 may include both volatile memory (e.g., random access memory) and non-volatile storage memory such as hard disks, flash memory, flash drives, external memory storage devices, USB drives, discs and the like. In addition to storing program instructions, the storage medium 130 stores various data associated with operation of the operating system 134, the anti-malware application 136, and user applications 132.

In one embodiment, the storage medium 130 comprises a non-transitory computer-readable storage medium. Various executable programs (e.g., the operating system 134, anti-malware application 136, and user applications 132) are each embodied as computer-executable instructions stored to the non-transitory computer-readable storage medium. The instructions, when executed by the processor 125, cause the client 120 to perform the functions attributed to the programs described herein.

The operating system 134 is a specialized program that manages computer hardware resources of the client 120 and provides common services to the user applications 132. For example, a computer's operating system 134 may manage the processor 125, storage medium 130, or other components not illustrated such as, for example, a graphics adapter, an audio adapter, network connections, disc drives, and USB slots. A cell phone's operating system 134 may manage the processor 125, storage medium 130, display screen, key pad, dialer, wireless network connections and the like. Because many programs and executing processes compete for the limited resources provided by the processor 125, the operating system 134 may manage the processor bandwidth and timing to each requesting process. Examples of operating systems 134 include WINDOWS, MAC OS, IOS, LINUX, UBUNTU, UNIX, and ANDROID.

The user applications 132 may include applications for performing a particular set of functions, tasks, or activities for the benefit of the user. Examples of user applications 132 may include a word processor, a spreadsheet application, and a web browser. In some cases, a user application 132 can be a source of malware that is unknowingly hidden in the user application 132. The malware may infect the client 120 when the user application 132 is installed.

An anti-malware application 136 detects and remediates malware, which may include ransomware as well as other types of malware. The anti-malware application 136 may prevent new malware from being installed on a client 120 or remove or disable existing malware that is already present on the client 120. The anti-malware application 136 may furthermore access a central server via the network 110 in order to download new malware definition files that specify characteristics or behaviors of known malware that the anti-malware application 136 seeks to detect.

The anti-malware application 136 includes an endpoint agent 138 that is configured to monitor and filter events for detection and remediation of malware. The endpoint agent 138 remediates malware when a detection is triggered. The endpoint agent 138 may roll back modified files to an earlier version (prior to a file being edited by a malware process) to undo damage from malware. The endpoint agent 138 may perform other types of remediation such as terminating the process and quarantining the source file. Quarantining the file isolates the source so that it is no longer capable of affecting operation of the client 120. Quarantining may include deleting the source file or moving it to a special area of memory. The endpoint agent 138 is described in further detail below.

Figure 2:
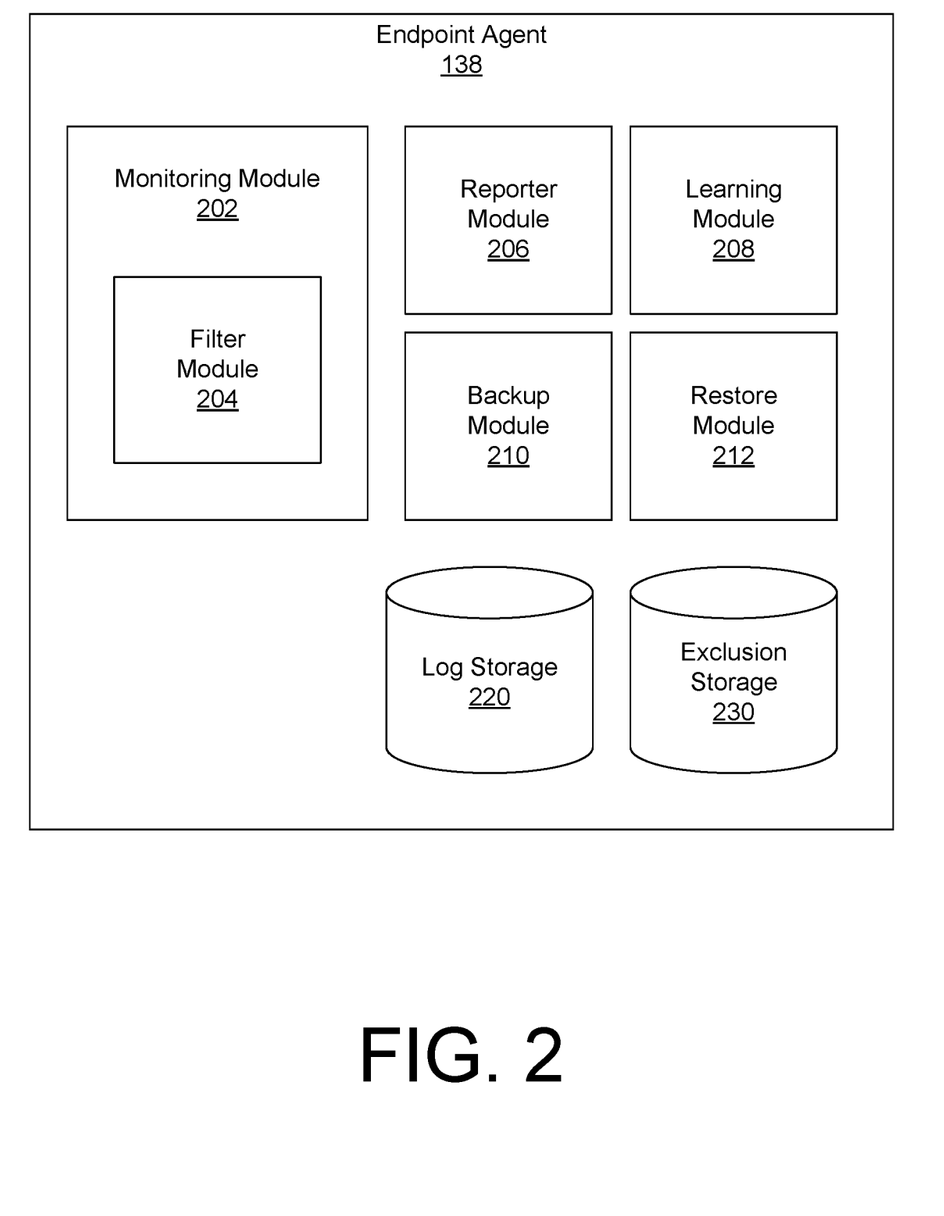
FIG. 2 is a block diagram illustrating an example embodiment of an endpoint agent of the anti-malware application.

FIG. 2 illustrates an example embodiment of an endpoint agent 138. The endpoint agent 138 includes a monitoring module 202 having a filter module 204, a reporter module 206, a learning module 208, a backup module 210, a restore module 212, a log storage 220, and an exclusion storage 230. Alternative embodiments may include different or additional modules or omit one or more of the illustrated modules.

The monitoring module 202 detects events associated with a process performing an operation on a file and stores information associated with untrusted events (event data) to log storage 220. A process is an instance of a computer program or component thereof (e.g., a user application 132 or operating system 134) that is being executed. Events may be filesystem, memory, or network activities. Filesystem activities correspond to actions such as creating files, deleting files, opening files for editing, writing to files, saving and closing files, or moving files. Memory activities may include operations of threads and processes, code injections, or user account control (UAC) elevation. Network activities may include transmission or receipt of TCP/UDP traffic, execution of a local DNS resolver, or connecting to a particular IP address or domain. The monitoring module 202 includes a filter module 204 for identifying untrusted events to be used in detection of malware. Once untrusted events are identified, the monitoring module 202 saves (logs) event data of the untrusted events to log storage 220. By logging only event data of untrusted events and not all detected events, the amount of information stored to log storage 220 can be reduced.

The filter module 204 determines whether a detected event matches an entry on an exclusions list. The exclusions list is stored in exclusion storage 230. An exclusions list is a set of entries that each specify a specific filtering parameter or combination of filtering parameters. The filtering parameters can identify event types based on processes, file characteristics, or combinations thereof. A filtering parameter identifying a process can be a process identifier (ID) or a location (e.g., directory) of an executable. A filtering parameter to identify a file characteristic can be a type of file (e.g., file extension), a location of a file (e.g., a directory or file path), or a combination thereof. If an entry on the exclusions list identifies a trusted process without further parameters, the filter module 204 operates to filter all events associated with the process including events associated with threads of the process. If an entry identifies a file characteristic without further parameters, the filter module 204 operates to filter all events by any process operating on a file having the specified file characteristics (e.g., operations on a particular specified type of file, operations on files stored to a particular specified file location, or a combination thereof). If an entry identifies both a process and a file characteristic (e.g., a file type, location, or combination thereof), the filter module 204 operates to filter all event corresponding to an action by the identified process on a file having the identified file characteristic.

The filter module 204 filters detected events that match entries in the exclusions list by excluding these events from being logged and reported to the server 105. If a detected event matches an entry on an exclusions list, it can be excluded from being monitored because the event is not indicative of malware. Such events are referred to herein as "trusted events." If a detected event does not match an event on an exclusions list, it is monitored by the monitoring module 202 and may be stored to log storage 220 and reported to the server 105 to determine if it could be indicative of malware. Such events are referred to herein as "untrusted events."

The reporter module 206 sends reports of untrusted events to the server 105 for detection of malware, and receives indications of malware detection from the server 105 in response to the reports. The reporter module 206 may send a single report including event data for individual untrusted events in real-time as events occur. Alternatively, the reporter module 206 may aggregate event data over a fixed period of time or over a number of untrusted events occurring, and send a report of a batch of event data to the server 105 for a plurality of events. The reporter module 206 also receives indications of malware detection in response to the report. By sending only the untrusted events to a server 105, the amount of information sent to the server 105 for malware detection can be reduced, thereby improving performance and bandwidth of both the endpoint agent 138 and the server 105.

The exclusions storage 230 stores the exclusions list. Initially, the exclusions list can include hardcoded exclusions that are manually predefined. These hardcoded exclusions can include entries for known system events that are associated with operating system activities and events associated with other known trusted processes and/or files that are not associated with malware. The exclusions list may be updated over time as new trusted events are learned by the learning module 208 described below. The entries on an exclusions list may include exclusions of particular processes, exclusions associated with particular file characteristics, and exclusions of a combination of processes and file characteristic.

The learning module 208 updates the exclusions list based on logged event data for previously untrusted events that are subsequently determined to not correspond to malware. The learning module 208 identifies exclusions by finding patterns in the logged event data that do not correspond to malware. For a set of logged events occurring during a time period when no malware was detected, the learning module 208 identifies respective counts of different event types that each correspond to unique combinations of a process and file characteristic. For example, the learning module 208 may count the number of events corresponding to a particular process executing on a file of a particular file type (e.g., a WINWORD process executing on a .docx file) or a particular process executing on a file in a particular file location (e.g., a EXCEL process executing on a file in a "Sheets" directory). When a counter for a particular event type exceeds a threshold value, the event type can be added as an entry to the exclusions list as an entry specifying the process and the file characteristic associated with the event type.

In some cases, the learning module 208 may make exceptions in which it skips adding a particular event type to the exclusions list even if a count for the event type exceeds a threshold value. For example, if a process associated with the event type is observed to be performing suspicious activity, the event type may be omitted from the exclusions list.

The learning module 208 may be configured to update the exclusions list periodically according to a first time period (e.g., every 24 hours). In each update, the learning module 208 may learn new exclusions from a set of the logged events in log storage that occurred over a second time period (e.g., a 48 hour window). The first period of time may be shorter than the second period of time so that each event may contribute to multiple different updates. The second period of time may correspond to an amount of time logged events are saved in log storage 220 before being purged or overwritten. Over a first period of time, the server 105 may indicate to the endpoint agent 138 that no malware was detected for some of the reported events (also logged to log storage 220). Once the first period of time has passed, the learning module 208 updates the exclusions list by processing the logged events occurring during the last second period of time that did not correspond to malware.

In some embodiments, the learning module 208 may use information from endpoint agents of other clients to update an exclusions list. For example, in some cases the server 105 may determine that different clients (e.g., 120A and 120C) have common patterns in reported events and share information (e.g., exclusions list) between endpoint agents 138 of the different clients. For example, if a client 120A reports events that are similar to events previously reported by client 120C, client 120A may more efficiently update its exclusions list by using a previously updated exclusions list of client 120C. The server 105 may identify common patterns in reported information between clients 120 and share information between different endpoint agents 138 of the clients 120 to more efficiently update an exclusions list.

The backup module 210 saves a copy of an original file prior to the file being edited by an untrusted process. The backup module 210 receives a notification from the monitoring module 202 indicating a file has been opened for editing by an untrusted process that is not on an exclusions list. Responsive to receiving the notification, the backup module 210 saves a copy of the original file prior to the file being edited by the monitored process to log storage 220.

In some embodiments, the backup module 210 may be configured to invoke certain exceptions so that it does not save a copy of the original file when certain predefined conditions occur. For example, the backup module 210 does not save a copy of the original file when it determines that a size of the original file meets or exceeds a threshold backup file size. In another example, the backup module does not save a copy of the original file when it determines that the monitored process created the original file. Saved copies of original files are kept for a specified time (e.g., 48 hours). Rollback is supported by the specified time (e.g., a client 120 can roll back modification to files up to 48 hours after a malware event is detected).

The restore module 212 restores a file to a saved copy of the original file when the changes to the file were determined to be caused by malware. The restore module 212 may receive a notification from the server 105 indicating that a process corresponds to malware. The restore module 212 may identify files for rollback by identifying logged events in log storage 220 associated with the process to determine which files the process modified. The restore module 212 then rolls back the identified files edited by the process (e.g., restore saved copies of the original file prior to being modified by the process). Alternatively, the restore module 212 may receive instructions from the server 105 to roll back files edited by a process corresponding to malware, and the restore module 212 can restore the files to the saved copy of the original file prior to the file being edited by the process corresponding to malware. In one embodiment, the restore module 212 may purge a portion of logged events in log storage 220 and only keep logged events relevant to rollback.

Figure 3:
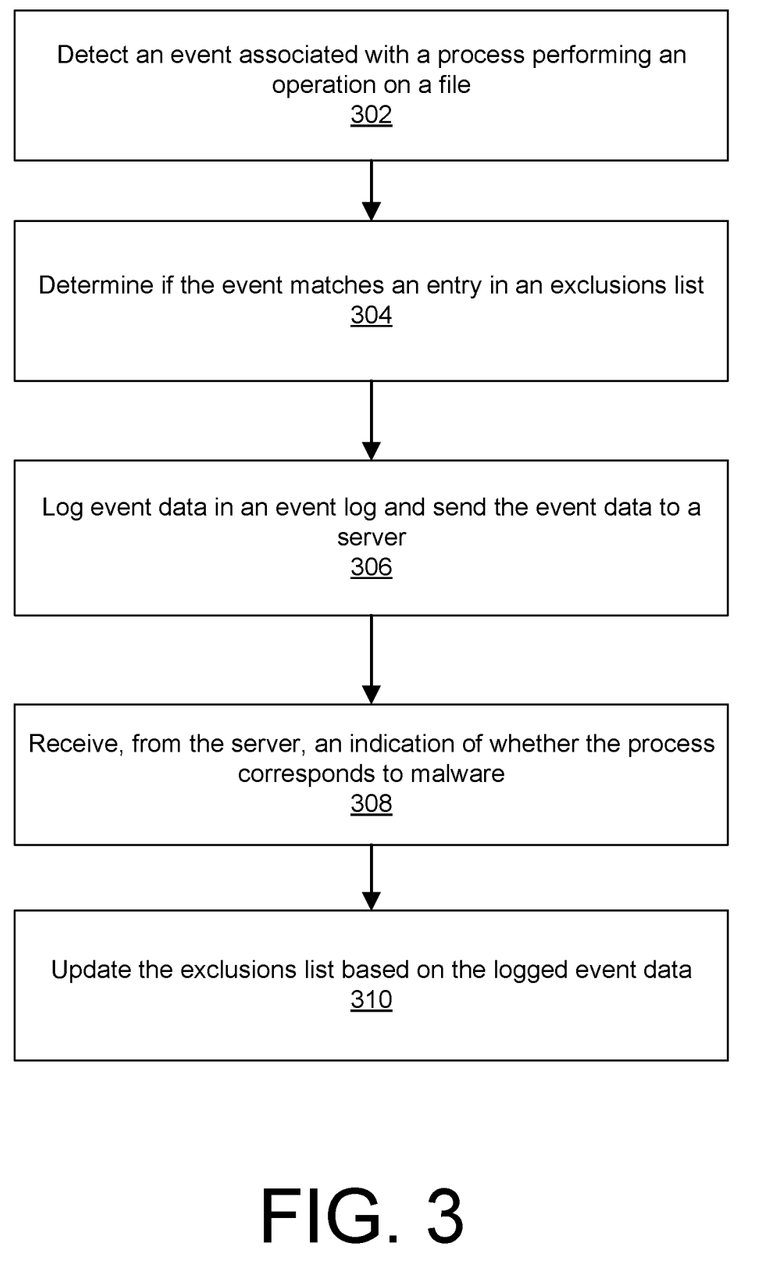
FIG. 3 is a flowchart illustrating an embodiment of a learning process for filtering events for malware detection.

FIG. 3 is a flowchart illustrating an embodiment of a learning process for filtering events analyzed for ransomware detection. The monitoring module 202 detects 302 an event associated with a process performing an operation on a file. The filter module 204 determines 304 if the event matches an entry in an exclusions list. Responsive to determining that the event is absent from the exclusions list, the monitoring module 202 logs 306 the event data in an event log (e.g., log storage 220), and the reporter module 206 sends the one or more events to a server 105. The endpoint agent 138 receives 308, from the server 105 an indication of whether the process corresponds to malware. Responsive to receiving an indication that the process does not correspond to malware, the learning module 208 updates 310 the exclusions list based on the logged events. The learning module 208 may update the exclusions list after a first predetermined period of time by identifying exclusions in the logged events during a second predetermined period of time that do not correspond to malware. The learning module 208 may count a number of times logged event data of a particular process operates on a file having a particular characteristic such as a file type or a directory. Responsive to the counted number of logged events meeting or exceeding a threshold number of events, the learning module adds an entry to the exclusions list if the process does not exhibit known suspicious behavior associated with malware.

Figure 4:
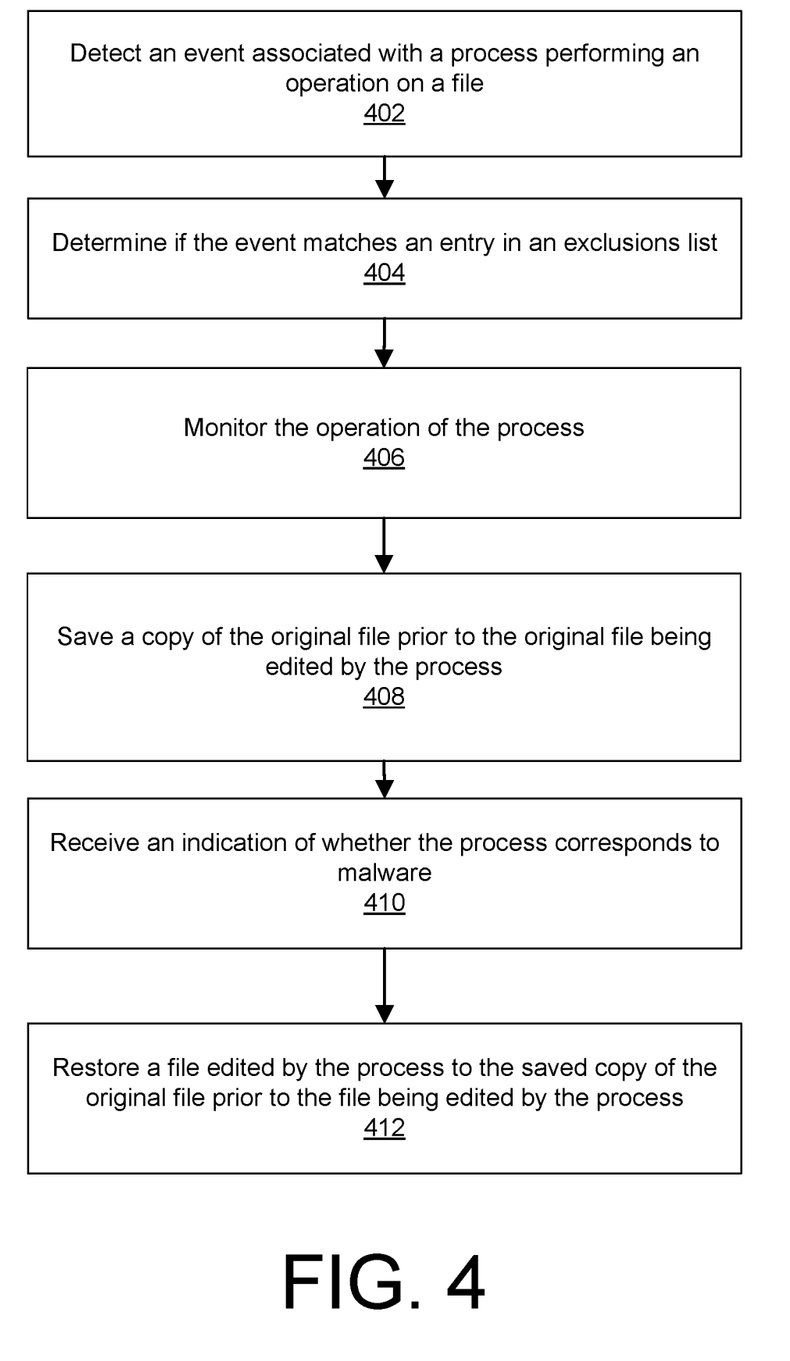
FIG. 4 is a flowchart illustrating an embodiment of a roll-back process for restoring files edited by malware.

FIG. 4 is a flowchart illustrating an embodiment of a roll-back process for restoring files edited by malware. The monitoring module 202 detects 402 an event associated with a process performing an operation on a file. The filter module 204 determines 404 if the event matches an entry in an exclusions list. Responsive to determining that the event is absent from the exclusions list, the monitoring module 202 monitors 406 the operations of the process. Responsive to detecting an opening of an original file by the process for editing, the backup module 210 saves 408 a copy of the original file prior to the original file being edited by the process. For example, the monitoring module 202 may detect certain application programming interface (API) calls from a process that are associated with opening and modifying the file. The monitoring module 202 intercepts the API calls prior to the API call executing, and the backup module 210 saves 408 the original file as a backup prior to the file being edited by the process. The endpoint agent 138 receives 410, from the server 105 after a first period of time, an indication of whether the process corresponds to malware. Responsive to receiving an indication that the process corresponds to malware, the restore module 212 restores 412 a file edited by the process to the saved copy of the original file prior to the file being edited by the process. The restore module 212 may identify files for rollback by using logged events in log storage 220. In one embodiment, the restore module 212 may remove logged data that is not used for rollback purposes from log storage 220.

The above-described system and processes beneficially enables an efficient detection and remediation of malware. By logging and sending only untrusted events, the endpoint agent 138 efficiently stores and sends only event data associated with suspicious processes and not all detected event data. By storing only files edited by suspicious processes associated with untrusted events, a larger number and/or size of files can be stored for rollback purposes over conventional methods of storing all modified files. By updating an exclusions list used for filtering events, the endpoint agent 138 continuously improves on the efficiency of its detection and remediation of malware.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for detecting malware comprising:
   detecting a plurality of events, each event associated with a process performing an operation on a file having a particular predefined characteristic;
   determining if each event of the plurality of events associated with the process matches an entry in an exclusions list;
   responsive to determining that each event of the plurality of events associated with the process is absent from the exclusions list, logging a plurality of event data describing the plurality of events associated with the process in an event log on a client device and sending the plurality of event data to a server;
   receiving, by the client device, an indication from the server of whether the process corresponds to malware based on whether the plurality of event data includes a pattern of events indicative of malware; and
   responsive to the received indication indicating that the process does not correspond to malware:
      maintaining, by the client device, a count of logged events corresponding to historical operations by the process performed on files having the particular predefined characteristic on the client device, and
      responsive to the count exceeding a threshold, adding an entry to the exclusions list stored on the client device to exclude future operations by the process on files having the particular predefined characteristic.

2. The method of claim 1, wherein the exclusions list includes an entry excluding events associated with a trusted process and determining if each event matches the entry in the exclusions list comprises:
   determining that an identifier of the process matches an identifier of the trusted process.

3. The method of claim 1, wherein the exclusions list includes an entry excluding events associated with a trusted process operating on a file having a first particular characteristic and determining if each event matches the entry in the exclusions list comprises:
   determining that an identifier of the process matches an identifier of the trusted process and that the operated-on file has the first particular file characteristic.

4. The method of claim 3, wherein the first particular file characteristic is one among a file type and a file directory.

5. The method of claim 1, wherein updating the exclusions list is performed periodically after a first period of time, the method further comprising:
   logging additional event data describing additional events in the event log occurring over a second period of time greater than the first period of time; and
   purging the event data occurring over the second period of time that is greater in age than the first period of time from the event log.

6. The method of claim 1 comprising:
   detecting a second event associated with a second process performing a second operation on a second file;
   determining if the second event associated with the second process matches an entry in the exclusions list;
   responsive to determining that the second event associated with the second process is absent from the exclusions list, logging second event data associated with the second process in the event log on the client device and sending the second event data to the server;
   receiving, by the client device, an indication from the server of whether the second process corresponds to malware; and
   responsive to the received indication indicating that the second process corresponds to malware, remediating the second process.

7. A non-transitory computer-readable storage medium storing instructions for detecting malware, the instructions when executed by a processor cause the processor to perform steps including:
   detecting a plurality of events, each event associated with a process performing an operation on a file having a particular predefined characteristic;
   determining if each event of the plurality of events associated with the process matches an entry in an exclusions list;
   responsive to determining that each event of the plurality of events associated with the process is absent from the exclusions list, logging a plurality of event data describing the plurality of events associated with the process in an event log on a client device and sending the plurality of event data to a server;
   receiving, by the client device, an indication from the server of whether the process corresponds to malware based on whether the plurality of event data includes a pattern of events indicative of malware; and
   responsive to the received indication indicating that the process does not correspond to malware:
      maintaining, by the client device, a count of logged events corresponding to historical operations by the process performed on files having the particular predefined characteristic on the client device, and
      responsive to the count exceeding a threshold, adding an entry to the exclusions list stored on the client device to exclude future operations by the process on files having the particular predefined characteristic.

8. The non-transitory computer-readable storage medium of claim 7, wherein the exclusions list includes an entry excluding events associated with a trusted process and determining if each event matches the entry in the exclusions list comprises:
  determining that an identifier of the process matches an identifier of the trusted process.

9. The non-transitory computer-readable storage medium of claim 7, wherein the exclusions list includes an entry excluding events associated with a trusted process operating on a file having a first particular characteristic and determining if each event matches the entry in the exclusions list comprises:
  determining that an identifier of the process matches an identifier of the trusted process and that the operated-on file has the first particular file characteristic.

10. The non-transitory computer-readable storage medium of claim 9, wherein the first particular file characteristic is one among a file type and a file directory.

11. The non-transitory computer-readable storage medium of claim 7, wherein updating the exclusions list is performed periodically after a first period of time, the instructions further comprising:
  logging additional event data describing additional events in the event log occurring over a second period of time greater than the first period of time; and
  purging the event data occurring over the second period of time that is greater in age than the first period of time from the event log.

12. The non-transitory computer-readable storage medium of claim 7, the instructions further including:
  detecting a second event associated with a second process performing a second operation on a second file;
  determining if the second event associated with the second process matches an entry in the exclusions list;
  responsive to determining that the second event associated with the second process is absent from the exclusions list, logging second event data associated with the second process in the event log on the client device and sending the second event data to the server;
  receiving, by the client device, an indication from the server of whether the second process corresponds to malware; and
  responsive to receiving an indication that the second process corresponds to malware, remediating the second process.

13. A computing system comprising:
  a processor; and
  a non-transitory computer-readable storage medium storing instructions for detecting malware, the instructions when executed by the processor cause the processor to perform steps including:
    detecting a plurality of events, each event associated with a process performing an operation on a file having a particular predefined characteristic;
    determining if each event of the plurality events associated with the process matches an entry in an exclusions list;
    responsive to determining that each event of the plurality events associated with the process is absent from the exclusions list, logging a plurality of event data describing the plurality of events associated with the process in an event log on a client device and sending the plurality of event data to a server;
    receiving, by the client device, an indication from the server of whether the process corresponds to malware based on whether the plurality of event data includes a pattern of events indicative of malware; and
    responsive to the received indication indicating that the process does not correspond to malware:
      maintaining, by the client device, a count of logged events corresponding to historical operations by the process performed on files having the particular predefined characteristic on the client device, and
      responsive to the count exceeding a threshold, adding an entry to the exclusions list stored on the client device to exclude future operations by the process on files having the particular predefined characteristic.

14. The computing system of claim 13, wherein the exclusions list includes an entry excluding events associated with a trusted process and determining if each event matches the entry in the exclusions list comprises:
  determining that an identifier of the process matches an identifier of the trusted process.

15. The computing system of claim 13, wherein the exclusions list includes an entry excluding events associated with a trusted process operating on a file having a first particular characteristic and determining if each event matches the entry in the exclusions list comprises:
  determining that an identifier of the process matches an identifier of the trusted process and that the operated-on file has the first particular file characteristic.

16. The computing system of claim 13, wherein updating the exclusions list is performed periodically after a first period of time, the instructions further comprising:
  logging additional event data describing additional events in the event log occurring over a second period of time greater than the first period of time; and
  purging the event data occurring over the second period of time that is greater in age than the first period of time from the event log.

17. The computing system of claim 13, the instructions further including:
  detecting a second event associated with a second process performing a second operation on a second file;
  determining if the second event associated with the second process matches an entry in the exclusions list;
  responsive to determining that the second event associated with the second process is absent from the exclusions list, logging second event data associated with the second process in the event log on the client device and sending the second event data to the server;
  receiving, by the client device, an indication from the server of whether the second process corresponds to malware; and
  responsive to the received indication indicating that the second process corresponds to malware, remediating the second process.

* * * * *